United States Patent
Zhang et al.

(10) Patent No.: US 9,515,789 B2
(45) Date of Patent: Dec. 6, 2016

(54) MIMO-OFDM SYSTEM FOR ROBUST AND EFFICIENT NEUROMORPHIC INTER-DEVICE COMMUNICATION

(71) Applicant: HRL LABORATORIES, LLC., Malibu, CA (US)

(72) Inventors: Deying Zhang, Oak Park, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 269 days.

(21) Appl. No.: 13/779,408

(22) Filed: Feb. 27, 2013

(65) Prior Publication Data
US 2014/0241211 A1    Aug. 28, 2014

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06N 3/02 | (2006.01) |
| H04L 5/00 | (2006.01) |
| H04L 27/26 | (2006.01) |
| G06N 3/063 | (2006.01) |
| G06N 3/08 | (2006.01) |
| G06N 3/04 | (2006.01) |

(52) U.S. Cl.
CPC ............ *H04L 5/0023* (2013.01); *G06N 3/063* (2013.01); *H04L 27/264* (2013.01); *G06N 3/02* (2013.01); *G06N 3/049* (2013.01); *G06N 3/0454* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 4,477,899 A | * | 10/1984 | Kato | H04L 12/56 370/307 |
| 6,327,603 B1 | * | 12/2001 | Niu | H03H 17/0266 708/405 |
| 7,245,630 B1 | * | 7/2007 | Chen | H04L 12/6418 370/458 |
| RE40,467 E | * | 8/2008 | Ryals | H04L 29/06 370/351 |
| 8,923,426 B2 | * | 12/2014 | Jafarian | H04B 7/0413 375/259 |
| 8,982,909 B2 | * | 3/2015 | Blasco Claret | H04B 1/0483 370/480 |
| 2009/0252247 A1 | * | 10/2009 | Lee | H04B 7/0417 375/267 |

(Continued)

FOREIGN PATENT DOCUMENTS

WO    2011012614    2/2011

OTHER PUBLICATIONS

Wireless Cellular Systems Performance Improvement Based on Neural Network Omar R. Daoud1, and Mohammed M. Ali2.*

(Continued)

*Primary Examiner* — Kakali Chaki
*Assistant Examiner* — Ababacar Seck
(74) *Attorney, Agent, or Firm* — Ladas & Parry

(57) ABSTRACT

A Multiple Input Multiple Output (MIMO) Orthogonal Frequency Division Multiplexing (OFDM) system for inter-device communication is described. Information data from each neuromorphic chip is coded and modulated, on the basis of destination, into different channels. The parallel signals in different channels are sent serially using TDM to a central router. After signal grouping by a central switching controller, each group of signals may be delivered to corresponding transmitter in the central router for transmission to a corresponding receiver in the neuromorphic chip using TDM.

20 Claims, 11 Drawing Sheets

500

(56) References Cited

U.S. PATENT DOCUMENTS

| | | | |
|---|---|---|---|
| 2011/0090100 A1* | 4/2011 | Shemirani | H01Q 3/40 341/100 |
| 2012/0109866 A1 | 5/2012 | Modha | |
| 2013/0073497 A1* | 3/2013 | Akopyan | G06N 3/049 706/27 |
| 2014/0212135 A1* | 7/2014 | Ji | H04Q 11/0066 398/51 |

OTHER PUBLICATIONS

May 1, 2000 Point-to-point connectivity between neuromorphic chips using address events Kwabena A. Boahen University of Pennsylvania, boahen@seas.upenn.edu.*
Wireless Cellular Systems Performance Improvement Based on Neural Network—2012 Omar R. Daoud1, and Mohammed M. Ali2.*
Point-to-point connectivity between neuromorphic chips using address events—2000 Kwabena A. Boahen University of Pennsylvania, boahen@seas.upenn.edu.*
A Neuromorphic VLSI System for Modeling Spike-Based Cooperative Competitive Neural Networks—2006 A dissertation submitted to the Swiss Federal Institute of Technology.*
ISR/WO for related PCT/US2013/028104 mailed on Dec. 24, 2013.
Dmitri Vainbrand, et al. "Scalable network-on-chip architecture for configurable neural networks." Special issue on Network-on-Chip Architectures and Design Methodologies, vol. 35, Issue 2, Mar. 2011. pp. 152-166.
Daniel B. Fasnacht, et al., "A Serial Communication Infrastructure for Multi-Chip Address Event Systems." In: 2008 IEEE International Symposium on Circuits and Systems, May 2008.
Syed Junaid Nawaz, et al., "Neural Network based MIMO-OFDM Channel equalizer using Comb-Type pilot arrangement", In: 2009 International Conference on Future Computer and Communication, Apr. 3-5, 2009. pp. 1-15.
Chapter I International Preliminary Report on Patentability (IPRP) for PCT/US2013/028104 issued on Sep. 1, 2015.
K. A. Boahen, "Point-to-point Connectivity between Neuromorphic Chips Using Address-Events," IEEE Transactions on Circuits and Systems II: Analog and Digital Signal Processing, vol. 47, No. 5, 416-434, May 2000.
P. A. Merolla, J. V. Arthur, B. E. Shi, and K. A. Boahen, "Expandable Networks for Neuromorphic Chips," IEEE Transaction on Circuits and Systems I: Regular Paper, vol. 54, No. 2, 301-311, Feb. 2007.
C. Bartolozz and G. Indiveri, "Selective Attention in Multi-chip Address-Event Systems," Sensors 2009, 9, 5076-5098.
J. Aweya, "On the Design of IP routers Part 1: Router Architectures", Journal of Systems Architecture, 46(2000) 483-511.
S. Felperin, P. Raghavan, and E. Upfal, "A Theory of Wormhole Routing in Parallel Computers," IEEE Transaction on Computers, vol. 45, No. 6, 704-713, Jun. 1996.
S. Badrouchi, A. Zitoumi, K. Torki, and R. Tourki, "Asynchronous NoC Router Design," Journal of Computer Science 1(3): 429-436, 2005.
L. A. Plana, S. B. Furber, S. Temple, M. Khan, Y. Shi, J. Wu, and S. Yang, "A GALS Infrastructure for Massively Parallel Multi-Processor," IEEE Design and Test of Computers, 24(5): 454-463, Sep.-Oct. 2007.
R. Serrano-Gotarredona, M. Oster, P. Lichtsteiner, A. Linares-Barranco, R. Paz-Vicente, F. Gómez-Rodríguez, L. Camuñas-Mesa, R. Berner, M. Rivas-Pérez, T. Delbrück, S. Liu, R. Douglas, P. Häfliger, G. Jiménez-Moreno, A. Civit Ballcels, T. Serrano-Gotarredona, A. J. Acosta-Jiménez, and B. Linares-Barranco, "CAVIAR: A 45k Neuron, 5M Synapse, 12G Connects/s AER Hardware Sensory-Processing-Learning-Actuating System for High-Speed Visual Object Recognition and Tracking," IEEE Transactions on Neural Networks, vol. 20, No. 9, 1417-1438, Sep. 2009.
J. Wu, "A Router for-4-Massively-parallel Neural Simulation," Ph.D thesis, University of Manchester.
M. Vetterli, "A Theory of Multirate Filter Banks," IEEE Transactions on Acoustics, Speech, and Signal Processing, vol. 35, No. 3, 356-372, 1987.
P.P. Vaidyanathan, "Multirate Systems and Filter Banks", Prentice-Hall, 1993.
H. Scheuermann and H. Gockler, "A Comprehensive Survey of Digital Transmultiplexing Methods," Proceeding of IEEE, vol. 69, No. 11, 1419-1450, Nov. 1981.

* cited by examiner

MIMO-OFDM SYSTEM FOR ROBUST AND EFFICIENT NEUROMORPHIC INTER-DEVICE COMMUNICATION

The present invention was made with support from the United States Government under Grant number HR0011-09-C-0001 (SyNAPSE) awarded by the Defense Advanced Research Project Agency (DARPA). The United States Government has certain rights in the invention.

BACKGROUND

1. Field

The present invention relates neuromorphic systems, and in particular, to a Multiple Input Multiple Output (MIMO) Orthogonal Frequency Division Multiplexing (OFDM) system for inter-device communication.

2. Background

Neuromorphic systems are electronic systems that may be configured to operate and model the function of the biological brain. These systems may include processing elements or circuits that mimic biological neurons and synapses. As the number of neurons and synapses increases, multiple neuromorphic devices are needed due to the constraints on the maximum device die size available using current processes.

Address event representation (AER) is a protocol that may be used in inter-device communication in neuromorphic systems. The communication is modeled by looking at the action potentials or spikes representing data. AER employs time-multiplexing for encoding spiking data from several groups of neurons into a single communication bus. Transceivers encode and decode spikes over a small set of high-speed wires by encoding each axon with a unique binary representation called an address-event. Neurons are grouped together to share a common encoder and a decoder to reduce device space requirements.

The address packets generated during spike events are transferred and delivered by routers and have been used in neuromorphic systems. The packets are delivered on a neuron-by-neuron basis in the network. During each packet delivery, the packets are sequentially decoded, searched through a look-up table, delivered to the router, and eventually forwarded to the appropriate target neuron. This type of packet delivery is also known as point-to-point connectivity, and may result in several communication issues. For example, data rate and capacity may be limited. Additionally, deadlock and livelock may occur, which may postpone packet delivery forever in the network without reaching the destination causing timing errors in spikes and affecting the performance and accuracy in devices with spike-timing dependent plasticity (STDP) or other timing dependent rules. Further, if the system is subject to traffic jams or constraints at a certain node, a system failure may occur. Another problem that may occur is that the look-up table in each node may consume substantial memory for the system.

Several examples of communication systems that have experienced the above described communication issues include K. A. Boahen, "Point-to-point Connectivity between Neuromorphic Chips Using Address-Events," *IEEE Transactions on Circuits and Systems II: Analog and Digital Signal Processing*, Vol. 47, No. 5, 416-434, May 2000; A. Merolla, J. V. Arthur, B. E. Shi, and K. A. Boahen, "Expandable Networks for Neuromorphic Chips," *IEEE Transaction on Circuits and Systems I*: Regular Paper, Vol. 54, No. 2, 301-311, February, 2007; C. Bartolozz and G. Indiveri, "Selective Attention in Multi-chip Address-Event Systems," *Sensors* 2009, 9, 5076-5098; J. Aweya, "On the Design of IP routers Part 1: Router Architectures", *Journal of Systems Architecture*, 46 (2000) 483-511; S. Felperin, P. Raghavan, and E. Upfal, "A Theory of Wormhole Routing in Parallel Computers," *IEEE Transaction on Computers*, Vol. 45, No. 6, 704-713, June 1996; S. Badrouchi, A. Zitoumi, K. Torki, and R. Tourki, "Asynchronous NoC Router Design," *Journal of Computer Science* 1(3): 429-436, 2005; L. A. Plana, S. B. Furber, S. Temple, M. Khan, Y. Shi, J. Wu, and S. Yang, "A GALS Infrastructure for Massively Parallel Multi-processor," *IEEE Design and Test of Computers*, 24(5): 454-463, September-October, 2007; R. Serrano-Gotarredona, M. Oster, P. Lichtsteiner, A. Linares-Barranco, R. Paz-Vicente, F. Gómez-Rodriguez, L. Camuñas-Mesa, R. Berner, M. Rivas-Pérez, T. Delbrück, S. Liu, R. Douglas, P. Häfliger, G. Jiménez-Moreno, A. Civit Ballcels, T. Serrano-Gotarredona, A. J. Acosta-Jiménez, and B. Linares-Barranco, "CAVIAR: A 45 k Neuron, 5M Synapse, 12G Connects/s AER Hardware Sensory-Processing-Learning-Actuating System for High-Speed Visual Object Recognition and Tracking," *IEEE Transactions on Neural Networks*, Vol. 20, No. 9, 1417-1438, September 2009; J. Wu, "A Router for Massively-parallel Neural Simulation," Ph.D thesis, University of Manchester; M. Vetterli, "A Theory of Multirate Filter Banks," *IEEE Transactions on Acoustics, Speech, and Signal Processing*, Vol. 35, no. 3, 356-372, 1987; P. P. Vaidyanathan, "Multirate Systems and Filter Banks", *Prentice-Hall*, 1993; H. Scheuermann and H. Gockler, "A Comprehensive Survey of Digital Transmultiplexing Methods," *Proceeding of IEEE*, Vol. 69, No. 11, 1419-1450, November, 1981.

SUMMARY

In one aspect, there is a system including a plurality of neuromorphic devices, each device having a transmitter and a receiver, the neuromorphic device being configured to 1) separate a plurality of data into a plurality of parallel channels based at least in part on a destination address of the plurality of data and a frequency band; 2) combine selected data of the plurality of data that share a common frequency band, and 3) transmit the combined data; and a central router coupled to the neuromorphic device having a transmitter and a receiver and configured to 1) receive the combined data at a receiver, 2) separate the combined data into first data sharing the same destination address, and 3) transmit the first data to another one of the plurality of neuromorphic devices associated with the destination address.

The plurality of neuromorphic devices may be configured to use one of frequency division multiplexing (FDM) and OFDM to separate the plurality of data, and the plurality of neuromorphic devices may include a MIMO device.

In another aspect, there is disclosed a method including separating at plurality of neuromorphic devices a plurality of data into a plurality of parallel channels based at least in part on a destination address of the plurality of data and a frequency band; combining selected data of the plurality of data that share a common frequency band, transmitting the combined data; receiving at a central router the combined data; separating into first data sharing the same destination address; and transmitting the first data to another one of the plurality of neuromorphic devices associated with the destination address.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
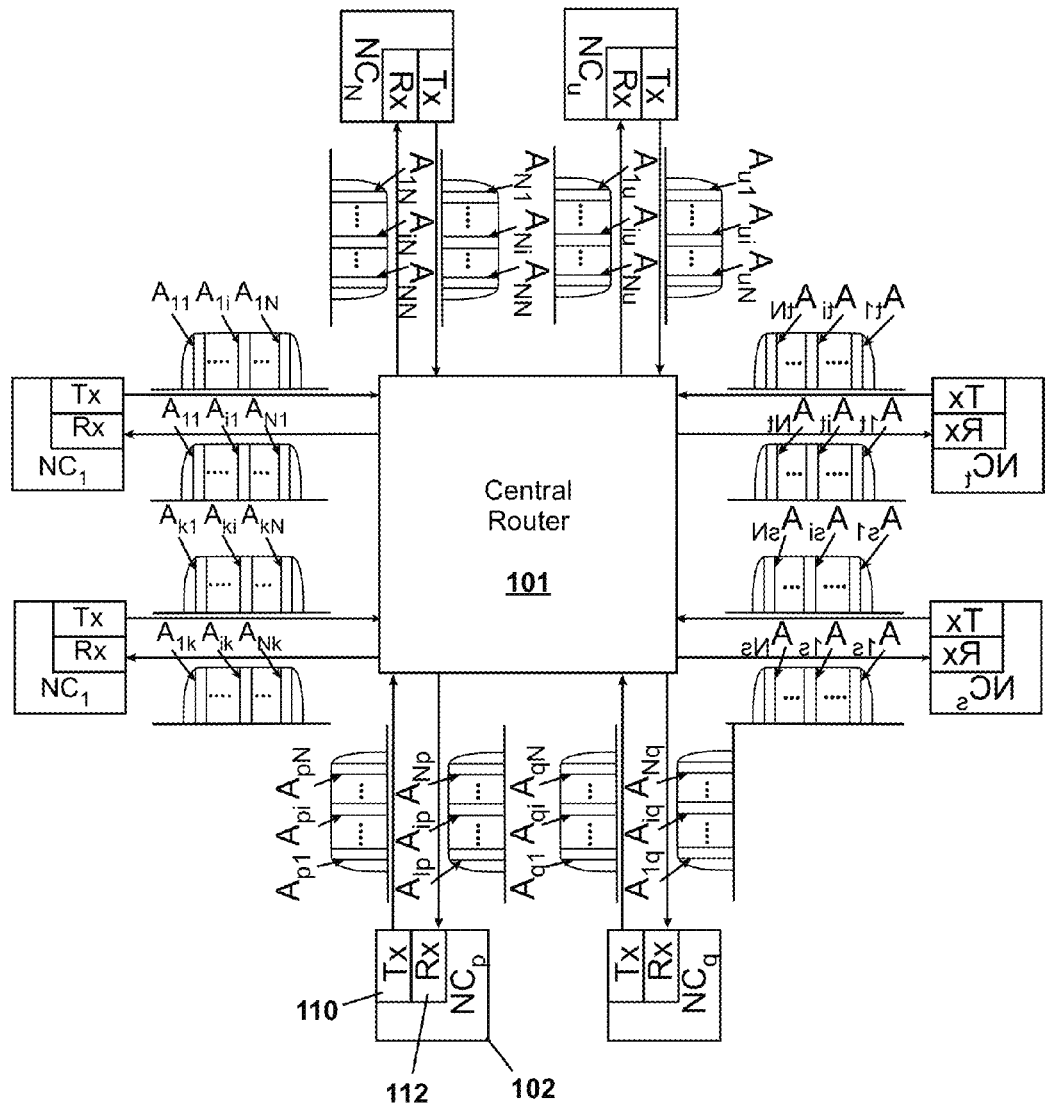
FIG. 1 illustrates a neuromorphic system according to the present disclosure.

Each of the additional features and teachings disclosed below can be utilized separately or in conjunction with other features and teachings to provide a device, system, and/or method for robust and efficient inter-device communication in a neuromorphic network. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings Inter-device communication in large scale neuromorphic systems is described, and may include combining orthogonal frequency division multiplexing (OFDM) and Multiple-in Multiple-out (MIMO) transceivers to enable parallel transmission of spike trains to multiple destinations while eliminating deadlock, livelock, and unpredictable traffic jams and/or constraints. Various multiplexing methods may be used for the transmission of spikes including time division multiplexing (TDM), frequency division multiplexing (FDM), and code-division multiplexing (CDM). Synaptic time multiplexing techniques may also be employed to reduce the number of physical hardware connections among neurons and synapses in neuromorphic chips through TDM, CDM, and other similar techniques.

In one embodiment, OFDM may be used to transmit multiple data streams over a common broadband medium. The disclosed system may include one or more OFDM transmitters to divide a broadband channel into one or more narrow-band, low-rate, and frequency non-selective subchannels or subcarriers. These subcarriers are orthogonal to each other so as to maximally reduce inter-carrier-interference (ICI). Accordingly, multiple data or symbols may be transmitted in parallel while maintaining a high spectral efficiency. Each subcarrier may also deliver information including a multiple access scheme, such as orthogonal frequency division multiple access (OFDMA), which enables different media such as video, graphics, speech, text, or other data to be transmitted using the same link independently and in parallel. The described neuromorphic inter-device communication system may include electronic devices, such as neuromorphic devices, that communicate between one another through OFDM based spike train transmission and reception methods.

In one embodiment, the described systems may include MIMO technology, which uses space-time signal processing in which time is complemented with the spatial dimension inherent in the use of multiple spatially distributed antennas (i.e., the use of multiple antennas located at different points). This means a receiver may be provided with multiple versions of the same signal. Such a multiple signal variation may reduce the probability that the signals may be affected at the same time. Accordingly, diversity helps to stabilize a signal path and improve performance, thereby reducing error rate.

The described neuromorphic systems may use routing channels or paths over which signals are transmitted. The paths or routing channels may have a range of less than one meter. In one embodiment, the neuromorphic system may include short range communication paths to reduce or obviate the need for channel estimation, error correction coding, and/or space-time frequency coding. A neuromorphic device may transmit spike timing data to a central router. After data processing and re-organization in the central router, the central router may transmit the various spike timing data to each neuromorphic device via transmitters in the router. The interface between the central router and neuromorphic devices may form the MIMO unit in one embodiment. By using OFDM methods, the central router and neuromorphic devices create a multi-user MIMO-OFDM platform for inter-device communication.

Various neural and synaptic computations may occur within a neuromorphic device in one embodiment. The neuromorphic device may be based on spiking neural networks in which the neurons integrate incoming synaptic currents and fire actions potential or spikes when the net integrated current exceeds a threshold. In one embodiment, the threshold value may be approximately ten millivolts or more. In one embodiment, the net integrated current may be the integration of an injection current from synapses and a leakage current from the neuron itself due to conductance at a certain time before firing.

A synapse may be the junction between two interconnected neurons. One terminal of the synapse may be associated with the neuron providing information (referred to hereinafter as the pre-synaptic neuron). The other terminal of a synapse may be associated with the neuron receiving information (this is referred hereinafter as the post-synaptic neuron). The synapses with synaptic conductance may be internally adjusted in accordance with a spike-timing dependent plasticity (STDP) discovered in the brain.

In one embodiment, the STDP may modulate the synaptic conductance based on a timing difference between the spikes of a pre-synaptic neuron and post-synaptic neuron. If the timing difference is positive, then the synapse may undergo depression or a reduction in conductance. If the timing difference is negative, then the synapse may undergo potentiation or an increase in conductance. The dynamics of potentiation P and depression D values may change at a synapse.

In one embodiment, neurons may reside on different neuromorphic devices and have to communicate with each other via one or more interconnects between the devices. In this embodiment, the P value may be transmitted with spiking event information to the receiving neuron to facilitate STDP. The D value may then be computed at each neuron locally and thus does not have to be transmitted between neuromorphic devices. The specific address of the post-synaptic neuron that receives the spike may also be included in the spiking event information that is transmitted to another neuromorphic device.

FIG. 1 illustrates a neuromorphic system 100 in an example. The system 100 may include a central router 101 and neuromorphic devices or chips (NC) 102. In one embodiment, the number of NCs may be any suitable number depending on data rate, Quality of Service (QoS), chip area, power consumption, and/or the circuitry of NC. Referring again to FIG. 1, an NC may be configured with a transmitter (Tx) 110 and a receiver (Rx) 112, and may house neurons, synapses, and STDP learning circuits. The signal transmission and reception may be configured to include OFDM.

Figure 2:
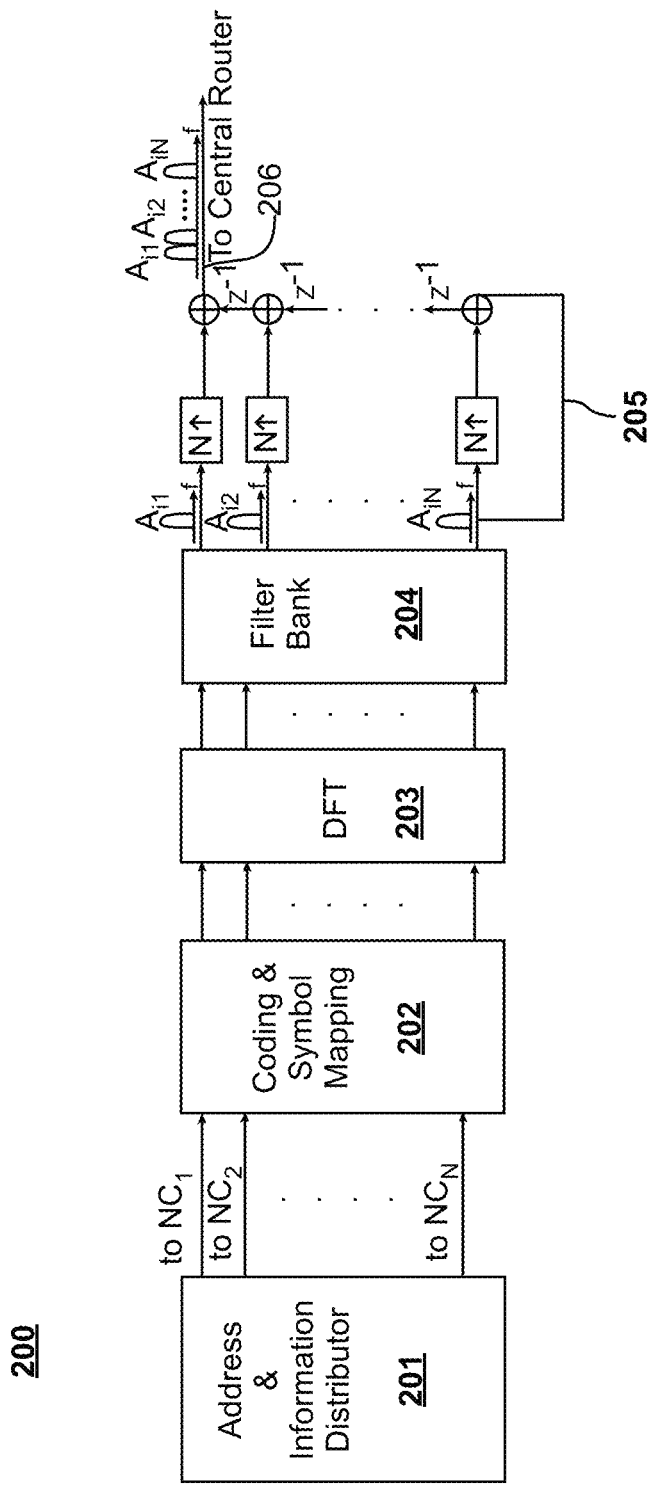
FIG. 2 illustrates a transmitter of a neuromorphic device (NC) according to the present disclosure.

FIG. 2 illustrates a transmitter 200 in an embodiment of the NC and includes an address and information distributor circuit 201, a coding and symbol mapping circuit 202, a Discrete Fourier Transform (DFT) circuit 203, a filter bank 204, an upsampler and delay chain circuit 205, and an output 206 to a central router.

Referring to FIG. 2, transmitting neuromorphic data, such as destination address and spike timing dependent plasticity (STDP), may be performed by distributing data to different channels having an index from 1 to N by the address and information distributor 201 and coding and symbol mapping circuit 202. The data in channel index of j will finally be sent to NCj, which is the NC with index number of j. The spike event data encoded using OFDM, $A_{ij}$, from a pre-synaptic neuron in the $i^{th}$ NC that is to be transmitted to the $j^{th}$ NC may be encoded as a word including two sub-words. In another embodiment, more than two sub-words may be used. The first sub-word may be a sub-word that encodes the P value required for making synaptic conductance changes at the synapse of the receiving post-synaptic neuron based on STDP. Another sub-word that encodes the unique address of the recipient of neuron within the neuromorphic system may also be included.

The data in each channel may then be allocated into a frequency band Aij with a center frequency of fj using the DFT circuit 203 and filter bank 204. The first index, i, of the frequency band Aij may be the index number of NC that sends data to different NCs. The second index, j, of the frequency band Aij may be the index number of NC that receives data from NCs with index number of i. Accordingly, the data in the transmitting NC may be divided into N channels and allocated into N frequency bands based on the receiving NCs using the data in the transmitting NC. Thus, the data may be separated into different channels on the basis of the intended destination using FDM. Using FDM for each AER event means only the destination address for neuron needs to be coded and delivered. This reduces the address bit requirement for each neuromorphic event.

After passing the filter bank, the sampling speed of data signals in each channel may be increased by N times. The channel signals may then be combined serially by a delay chain and upsampler circuit 205. In one embodiment, the data in different channels corresponding to a selected frequency band may be combined into one signal channel and sent using time division multiplexing (TDM). In one embodiment, there may be one receiver in the central router that corresponds to the transmitter in NC to form a transmultiplexer for data sending, receiving, and processing.

Figure 3:
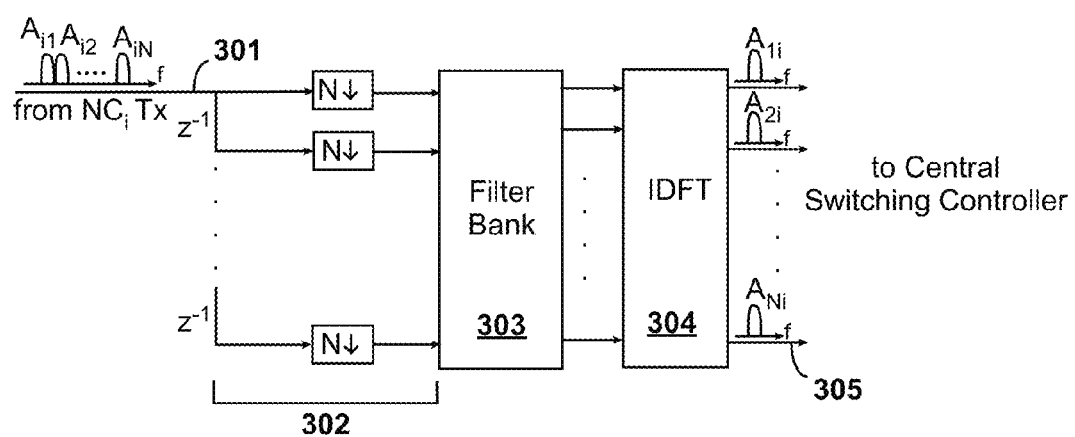
FIG. 3 illustrates a receiver of a central router according to the present disclosure.

As shown in FIG. 3, the data signal from the transmitter in NC may be received and processed by a receiver 300 in the central router. In one embodiment, the signal may be received at 301 and processed using serial to parallel conversion through delay chain and sample decimation circuit 302 by a factor of N. The output signals may then be fed to the filter bank 303 and IDFT circuit 304 to form the baseband signal for each subband at an output 305. Because the filter bank in the receiver of the central router is matched with the filter bank in the corresponding transmitter of the NC, the signal in each channel at the end of the receiver in central router shown may be substantially the same as the signal in each channel of the corresponding transmitter in the NC.

The retrieved parallel data in each channel is then sent to a center switch controller or the central router for further processing, such as subband coding, signal equalization or compensation, denoising, interference cancellation, and delay control. The signal subband with the same destination may be regrouped by fixed wiring routing. After regrouping, the data with same destination may be delivered to corresponding transmitters in the central router. The regrouped signals may then be sent to the NC.

Figure 4:
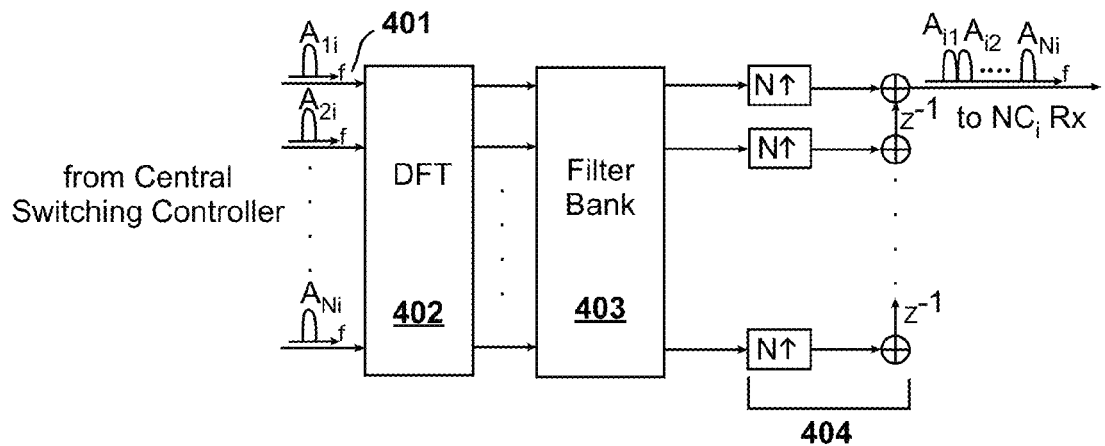
FIG. 4 illustrates a transmitter of a central router according to the present disclosure.

As shown in FIG. 4, on receiving the signal band with the same destination in the transmission circuit 400 of the central router at input 401, the signal band is passed through the DFT circuit 402 and filter bank 403. The transmitter 400 may allocate a sub frequency band with a center frequency for a signal in each corresponding channel.

The transmitter 400 performs parallel to serial conversion for the signal in each channel through the upsampler and delay chain 404. The same frequency band and sub frequency band used in the transmitter of the NC may be applied to the transmitters in the central router.

Figure 5:
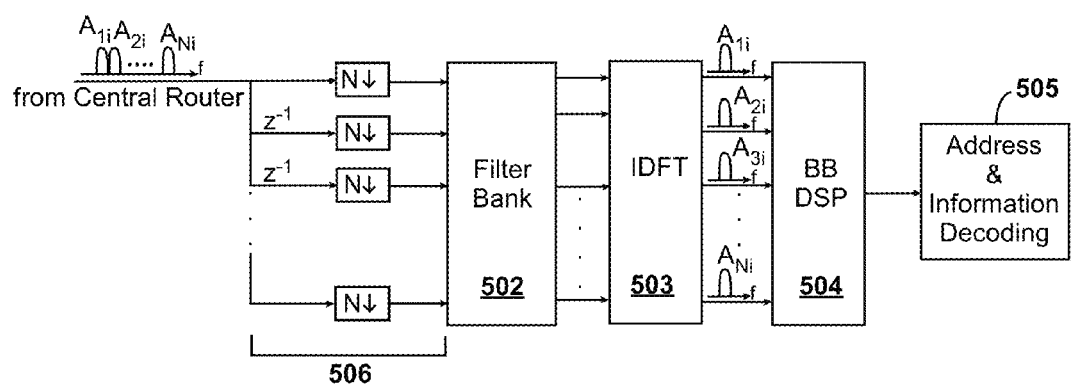
FIG. 5 illustrates a receiver of a NC according to the present disclosure.

The serial signal from each transmitter in central router may be sent to a corresponding NC at output 405. The data signal decoding by each receiver in its corresponding NC is shown in FIG. 5. Due to signal regrouping in central switching controller, the receiver 500 in the NC may receive all the signals that are sent from all NC. Signals from each NC may be allocated into a corresponding channel with a matched sub frequency band. The signal at input 501 is converted through the delay chain and down sampling circuit 506. These resulting signals in each receiver in corresponding to the NC may be channelized through filter bank 502 and IDFT circuit 503. These channelized signals may then be processed by the digital signal processing and baseband circuit 504. The output is then fed to the address and information decoding circuit 505.

Figure 6:
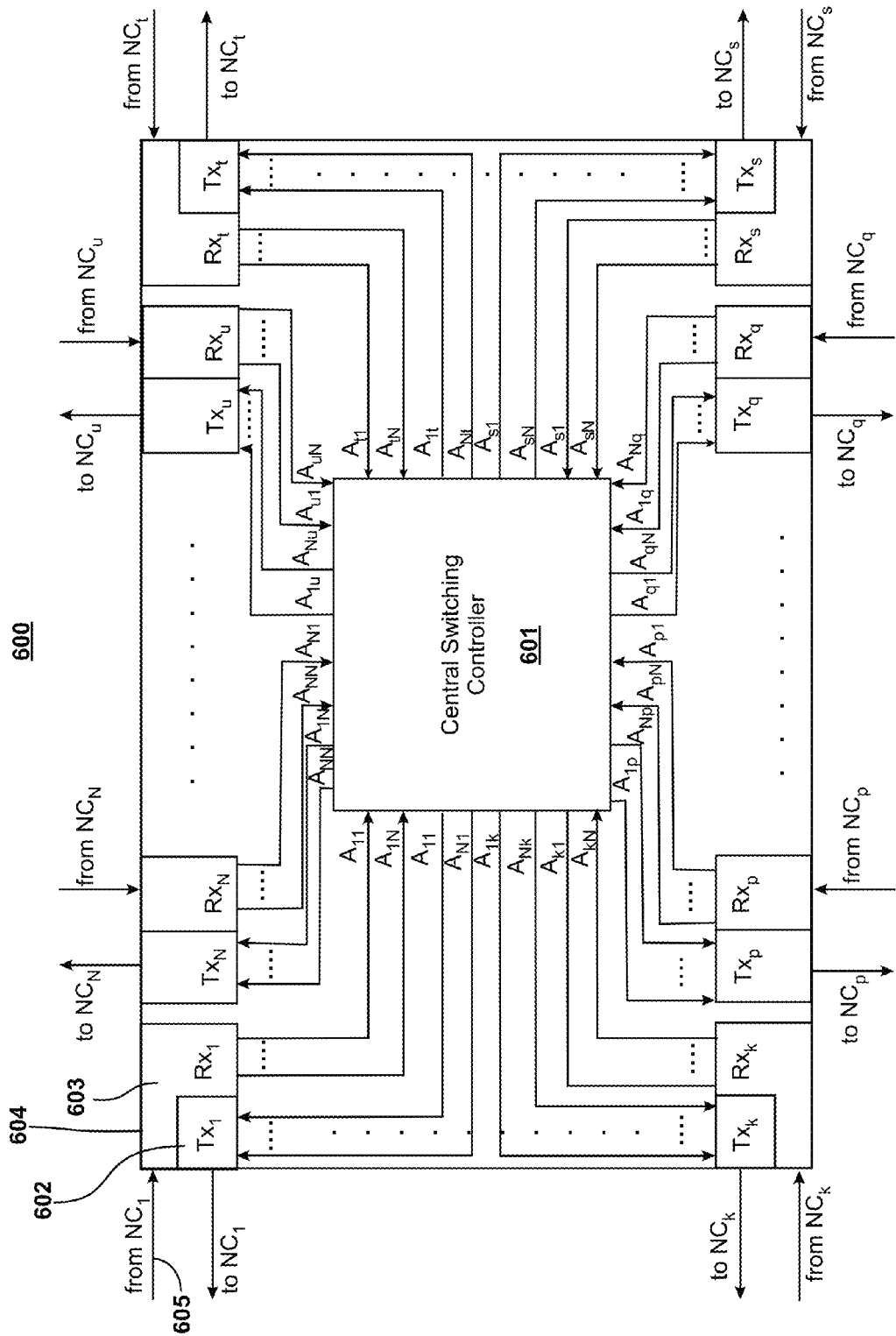
FIG. 6 illustrates a central router according to the present disclosure.

FIG. 6 illustrates a central router 600 for processing spike events as OFDM signals $A_{ij}$ between the NCi and NC j in an embodiment. The central router 600 may include a central switching controller 601 and a MIMO unit 604 including transmitters 602 and 603 receivers. The router 600 may also include wired connections 604 to the NCs 605 and be configured as a multiuser MIMO OFDM system.

After receiving and de-multiplexing the spike event data from each NC within the central router 600, the data may be re-arranged using a central switching controller 601. The controller 601 may enable spike events in the form of U bit words to be routed to Tx within the central router 600. At each Tx within the central router 600, a new single spike event data signal may be composed and then transmitted to its destination NC. This process may occur in parallel for all NC within the neuromorphic system. At a destination NC, the composite signal from the central router 600 may be received by its Rx and then de-multiplexed using DFT into N bit words and routed to destination neurons within the NC.

The system may be a real-time routing system for spike events, which occur in different NCs and are routed and delivered independently and/or in parallel. This configuration may make the system tolerant to failures. Furthermore, issues that can affect AER type neuromorphic inter-device communication such as deadlock, livelock, limited data rate, and unpredictable data traffic jam may be eliminated. Data rate and capacity may also be higher than known node-by-node schemes.

Figure 7:
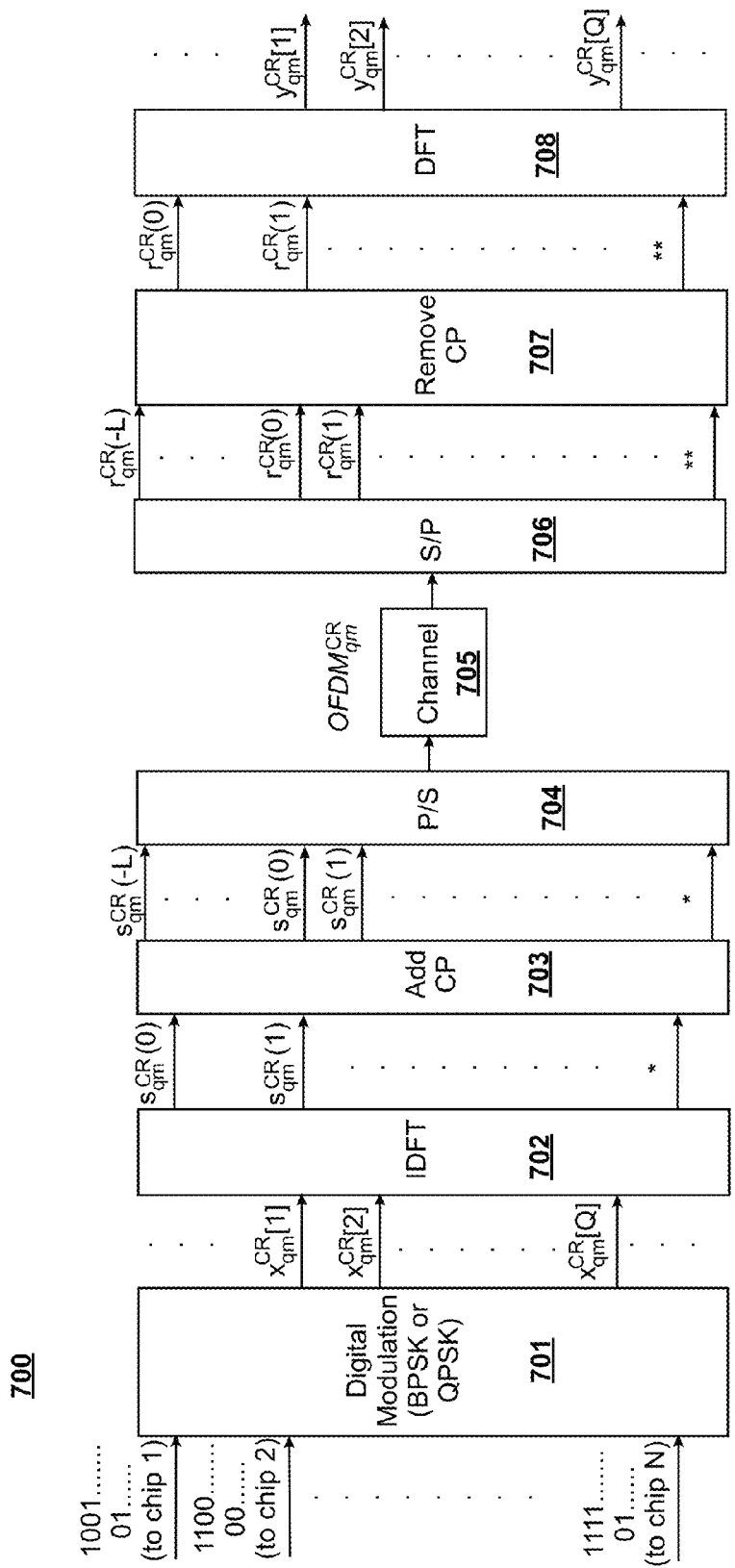
FIG. 7 illustrates a transformation of a spike event from a NC into an OFDM signal and recovered in a central router according to the present disclosure.

In one embodiment, a spike event from an electronic device to an OFDM signal may be transformed, as shown in FIG. 7. The system 700 may include a digital modulation circuit 701, an IDFT circuit 702, a circuit to add Cyclic Prefix (CP) 703, and a circuit 704 for parallel to serial conversion of the data signal. The output of circuit 704 may be sent over a channel 705 and received at a circuit 706 for serial to parallel conversion. The CP may be removed by a circuit 707 and passed to DFT circuit 708. A spike event may be represented by U binary bits as described above and input into a digital modulator 707. These binary bit streams generated within a NC may be transmitted by different subcarriers to different target devices. In each sub-channel, the spike event bit stream may be mapped or modulated into symbols through BPSK or QPSK. Quadrature Amplitude Modulation (QAM), Pulse Amplitude Modulation (PAM), and M-ary Phase Shift Keying (MPSK) may also be used. For BPSK, each bit in the bit stream corresponds to one symbol. Thus, there are a total of M symbols. The value of each symbol is 1, if the value of corresponding bit is 1. Otherwise, the value of symbol will be −1.

For QPSK, each of the two bits in the bit stream may be mapped into one symbol in which the first bit is for the real value of the symbol and the other for the imaginary value of the symbol. The value of real or imaginary part of the symbol may be 1 if the corresponding bit value is 1. Otherwise the value of the real or imaginary part of the symbol is −1. For each U-bit spike event, there are U symbols for BPSK modulation or U/2 symbols for QPSK modulation.

These symbols may be transmitted to various destination neuromorphic devices and may be carried by unique OFDM subcarriers. In the following discussion, let N is the size of FFT (Fast Fourier Transformation) and IFFT (Inverse Fast Fourier Transformation) for the OFDM. Let $x_{qm}^{CR}[k]$ and $x_{qm}^{RC}[k]$ denote the $m^{th}$ OFDM symbol at $k^{th}$ subcarrier in the $q^{th}$ device, where CR denotes symbols being transmitted from the device to central router and RC denotes symbols being transmitted from the central router to the NC, respectively. OFDM symbols, $x_{qm}^{CR}[k]$, is transmitted from the NC to the central router using the K OFDM subcarriers.

Each time domain OFDM symbol, $s_{qm}^{CR}(n)$ for the $n^{th}$ symbol in N, is generated by Inverse Fast Fourier Transform (IFFT) in the transmitter of the $q^{th}$ device may be expressed as:

$$s_{qm}^{CR}(n) = \sum_{k=0}^{K-1} x_{qm}^{CR}[k] \cdot e^{j\frac{2\pi}{N}k,n} \quad (1)$$

Thus, an OFDM symbol from the $q^{th}$ device may be represented using a column vector as $$\vec{S}_{qm}^{CR} = [s_{qm}^{CR}(0) s_{qm}^{CR}(1) \ldots s_{qm}^{CR}(N-1)]^T \quad (2)$$

where T represents the transpose operator. In order to overcome the inter symbol interference (ISI) during transmission, the length P of cyclic prefix (CP) may be added in front of each OFDM symbol. CP extends the OFDM symbol by padding the last L samples of the OFDM in front of the original OFDM of length N. This serves to provide a guard interval for OFDM symbols that is longer than the delay in the multipath channel, and. ensures that the samples in the subcarriers are orthogonal and thus helps to overcome ISI. After adding CP, each OFDM symbol can be represented as $$\vec{S}_{qm}^{CR} = [s_{qm}^{CR}(-L) \ldots s_{qm}^{CR}(-1) s_{qm}^{CR}(0) s_{qm}^{CR}(1) \ldots s_{qm}^{CR}(N-1)]^T \quad (3)$$

These OFDM symbols are transmitted to the central router through the MIMO interface between devices and the central router. The OFDM symbol vectors, $\vec{R}_{qm}^{CR}$, received by the central router through various receivers can be expressed as:

$$\begin{bmatrix} \vec{R}_{1m}^{CR} \\ \vec{R}_{2m}^{CR} \\ \vdots \\ \vec{R}_{Qm}^{CR} \end{bmatrix} = \begin{bmatrix} \vec{h}_{11}^{CR}(\tau, t) & \vec{h}_{12}^{CR}(\tau, t) & \ldots & \vec{h}_{1Q}^{CR}(\tau, t) \\ \vec{h}_{21}^{CR}(\tau, t) & \vec{h}_{22}^{CR}(\tau, t) & \ldots & \vec{h}_{2Q}^{CR}(\tau, t) \\ \vdots & \vdots & \ddots & \vdots \\ \vec{h}_{Q1}^{CR}(\tau, t) & \vec{h}_{Q2}^{CR}(\tau, t) & \ldots & \vec{h}_{QQ}^{CR}(\tau, t) \end{bmatrix} * \begin{bmatrix} \vec{S}_{1m}^{CR} \\ \vec{S}_{2m}^{CR} \\ \vdots \\ \vec{S}_{Qm}^{CR} \end{bmatrix} + W^{CR} \quad (4)$$

where '*' represented the discrete convolution operation between two vectors, $\vec{h}_{qq'}^{CR}(\tau,t)$ represent the impulse response of the multipath channel between transmitter in the $q^{th}$ device and the $q'^{th}$ receiver in the central router, and τ and t are the delay and time of the channel impulse response due to multipath time and frequency fading channel effect respectively.

Major sources of corruption of channel signals are noise (thermal or due to interfering signals), multipath propagation which leads to ICI and nonlinear distortion induced by operating the transmitter's power amplifier in the high-gain region. In one embodiment, additive white Gaussian noise (AWGN) may be used to overcome the sources of corruption. This is because different NCs are independent of each other and are connected via wired connections. Accordingly, nonlinear distortion is minimal and the transmitter can transmit signals without the need to amplify at high gain.

In equation (4), $W^{CR}$ is the matrix for identically and independently distributed AWGN for each channel. Since each Tx in the device is connected by wires to a corresponding Rx in the central router, equation (4) can be simplified as follows:

$$\begin{bmatrix} \vec{R}_{1m}^{CR} \\ \vec{R}_{2m}^{CR} \\ \vdots \\ \vec{R}_{Qm}^{CR} \end{bmatrix} = \begin{bmatrix} \vec{h}_{11}^{CR}(\tau,t) & 0 & \cdots & 0 \\ 0 & \vec{h}_{22}^{CR}(\tau,t) & \cdots & 0 \\ \vdots & \vdots & \ddots & \vdots \\ 0 & 0 & \cdots & \vec{h}_{QQ}^{CR}(\tau,t) \end{bmatrix} * \begin{bmatrix} \vec{S}_{1m}^{CR} \\ \vec{S}_{2m}^{CR} \\ \vdots \\ \vec{S}_{Qm}^{CR} \end{bmatrix} + \begin{bmatrix} \vec{W}_{1m}^{CR} \\ \vec{W}_{2m}^{CR} \\ \vdots \\ \vec{W}_{Qm}^{CR} \end{bmatrix} \quad (5)$$

where $\vec{W}_{qm}^{CR}$ is the AWGN vector for each channel. The AWGN vector can be further expressed in terms of CP as follows:

$$\vec{W}_{qm}^{CR} = [w_{qm}^{CR}(-L) \ldots w_{qm}^{CR}(-1) w_{qm}^{CR}(0) w_{qm}^{CR}(1) \ldots w_{qm}^{CR}(N-1)]^T \quad (6)$$

The received signal vector, $\vec{R}_{qm}^{CR}$, in the central router can be expressed as a column vector as:

$$\vec{R}_{qm}^{CR} = [r_{qm}^{CR}(-L) \ldots r_{qm}^{CR}(-1) r_{qm}^{CR}(0) r_{qm}^{CR}(1) \ldots r_{qm}^{CR}(N-1)]^T \quad (7)$$

Since the channel is a static, the vector for channel impulse response can be simplified and expressed as a column vector as follows:

$$\vec{h}_{qq}^{CR}(\tau,t) = \vec{h}_q^{CR}(\tau) = [h_q^{CR}(0) h_q^{CR}(1) \ldots h_q^{CR}(L-1)]^T \quad (8)$$

In order to further reduce ISI for OFDM, square-root-raise-cosine FIR filter or square wave filter may be used for pulse shaping. The channel may be considered a Nyquist filter and the impulse response of the channel can be expressed as:

$$h_q^{CR}(n) = \begin{cases} h_q^{CR}(0) & n = 0 \\ 0 & \text{otherwise} \end{cases} \quad (9)$$

Therefore, the OFDM symbols received by the central router can be expressed as:

$$r_{qm}^{CR}(n) = \sum_{l=0}^{L-1} h_q^{CR}(l) \cdot s_{qm}^{CR}(n-l) + w_{qm}^{CR}(n) = h_q^{CR}(0) \cdot s_{qm}^{CR}(n) + w_{qm}^{CR}(n) \quad (10)$$

where n can take values between -L to N-1. The entire process of signal transmission from device to central router is summarized in FIG. 10.

After removing CP from the received OFDM symbols and performing FFT, the symbols, $y_{qm}^{CR}[k]$, received by central switch unit in the central router can be expressed as follows:

$$y_{qm}^{CR}[k] = \frac{1}{N} \sum_{n=0}^{K-1} r_{qm}^{CR}(n) \cdot e^{-j\frac{2\pi}{N}k \cdot n} \quad (11)$$

Based on equations (1), (10), and (11), the following equations can be established:

$$y_{qm}^{CR}[k] = h_q^{CR}(0) \cdot x_{qm}^{CR}[k] + w_{qm}^{CR}[k] \quad (12)$$

$$w_{qm}^{CR}[k] = \frac{1}{N} \sum_{n=0}^{K-1} w_{qm}^{CR}(n) \cdot e^{-j\frac{2\pi}{N}k \cdot n} \quad (13)$$

As shown in Equation (12), the symbols for information bits of spike event are simultaneously and independently transmitted from each device and received by central router in parallel. This may occur even if there is degradation from AWGN. After arriving at the central router, the symbols for spike events may be re-arranged as:

$$x_{qm}^{RC}[k] = y_{km}^{CR}[q] \quad (14)$$

where transmissions to be dispatched to a given destination device q may be regrouped into a single Tx in the central router based on the particular subcarrier allocated to that destination device. In one embodiment, let the sample period for the system be of duration $T_s$. The re-arranged symbols, $x_{qm}^{RC}[k]$, may be used to generate time domain OFDM symbols, $s_{qm}^{RC}(n)$, in each of its corresponding Tx in the central router through IFFT as follows:

$$s_{qm}^{RC}(n) = \sum_{k=0}^{K-1} x_{qm}^{RC}[k] \cdot e^{j\frac{2\pi}{N}k \cdot n} \quad (15)$$

where n represents the $n^{th}$ sampling period. After adding CP in front of each OFDM symbol, a symbol may be transmitted to different neuromorphic devices through the MIMO interface in the central router. Because the wired channel between the central router and devices is a static Nyquist filter, the OFDM symbols, $r_{qm}^{RC}(n)$, received by each neuromorphic device can be expressed as:

$$r_{qm}^{RC}(n) = \sum_{l=0}^{L-1} h_q^{RC}(l) \cdot s_{qm}^{RC}(n-l) + w_{qm}^{RC}(n) = h_q^{RC}(0) \cdot s_{qm}^{RC}(n) + w_{qm}^{RC}(n) \quad (16)$$

where $h_q^{RC}(l)$ is the channel impulse response for each channel between the central router to neuromorphic device, and $w_{qm}^{RC}(n)$ is the AWGN for each channel from central router to neuromorphic device. Through a similar process as described above (for signal transmission), symbols for spike events, $y_{qm}^{RC}[k]$, received by each device can be expressed as:

$$y_{qm}^{RC}[k] = h_q^{RC}(0) \cdot x_{qm}^{RC}[k] + w_{qm}^{RC}[k] \quad (17)$$

$$w_{qm}^{RC}[k] = \frac{1}{N} \sum_{n=0}^{N-1} w_{qm}^{RC}(n) \cdot e^{-j\frac{2\pi}{N}k \cdot n} \quad (18)$$

By using equation (14), equation (17) can be further expressed as:

$$y_{qm}^{RC}[k] = h_q^{RC}(0) \cdot h_q^{CR}(0) \cdot x_{km}^{CR}[q] + h_q^{RC}(0) \cdot w_{km}^{CR}[q] + w_{qm}^{RC}[k] \quad (19)$$

Equation (19) shows that each neuromorphic device simultaneously and independently receives information bits of spike events from different neuromorphic devices through the central router in parallel. Assuming AWGN, $w_{qm}^{RC}[k]=w_{qm}^{CR}[q]=w$. The signal to noise ratio for each neuromorphic device can be expressed as:

$$SNR = \left(\frac{h_q^{RC}(0) \cdot h_q^{CR}(0)}{h_q^{RC}(0)+1}\right)^2 \cdot \left(\frac{x_{km}^{CR}[q]}{w}\right)^2 \quad (20)$$

Figure 8:
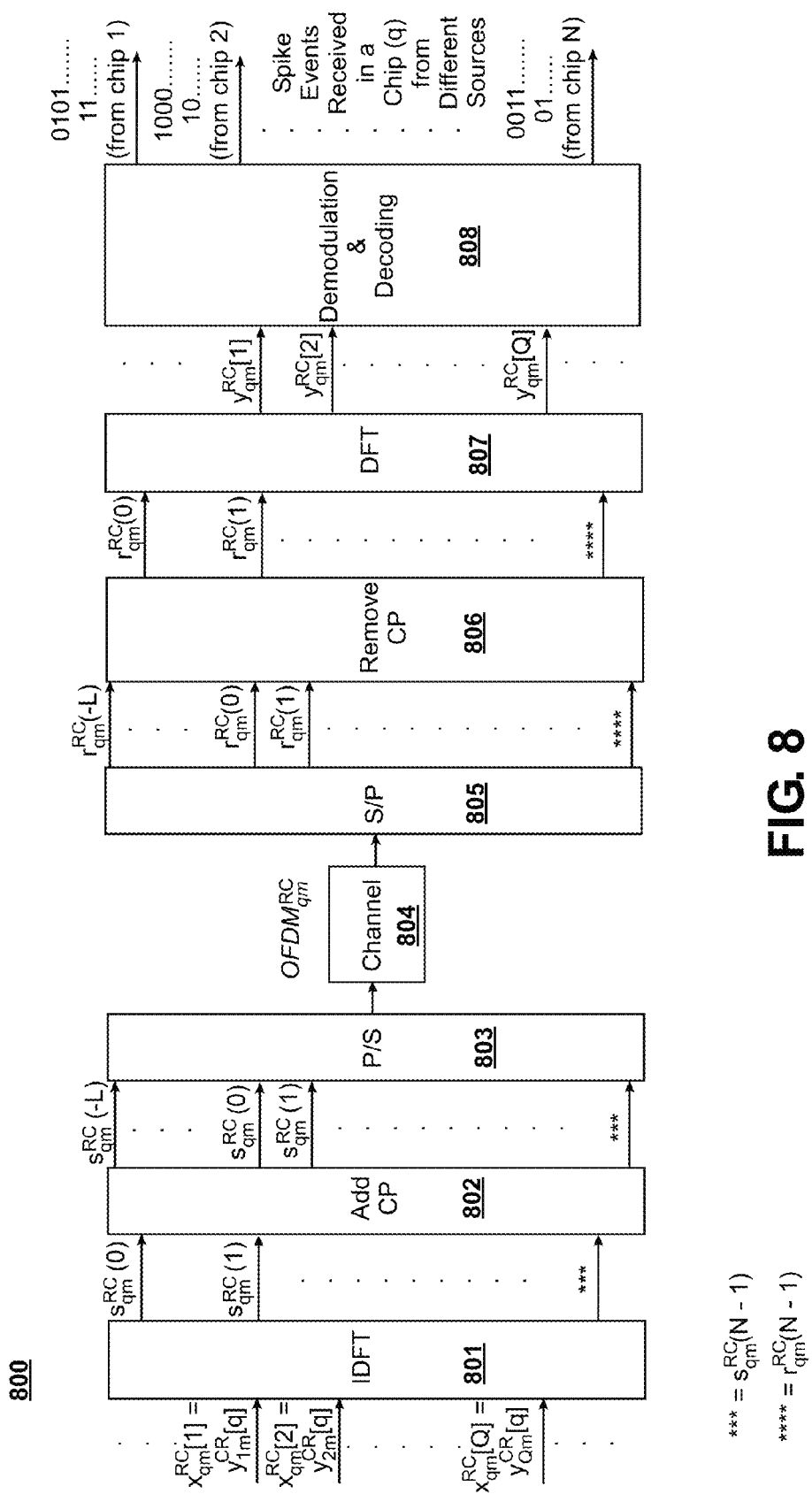
FIG. 8 illustrates a transformation of a demodulated spike event in the central router into an OFDM signal and a recovery inside an NC into spike data according to the present disclosure.

Equation (20) shows that, even though the noise in each channel degrades the symbols for spike event information, this effect can be overcome by adding one scale multiplier in each channel with the value of scale larger than 2 (i.e., $h_q^{RC}(0)=h_q^{CR}(0)=h\geq 2$). The process of signal transmission from the central router to each neuromorphic device is shown in FIG. 7. T Referring to FIG. 8, the system 800 may include an IDF circuit 801, a circuit to add CP 802, a circuit for parallel to serial conversion 803, a channel 804, a circuit for serial to parallel conversion 805, a circuit 806 to remove CP, a DFT circuit 807, and a demodulating and decoding circuit 808.

For BPSK and QPSK, the probability of bit error, $P_b$, which is the expected value of bit error rate (BER), can be expressed as follows:

$$P_b = F\left(\sqrt{\frac{2E_b}{N_0}}\right) \quad (21)$$

where $E_b$ is the energy per bit, $N_0/2$ is the noise power spectral density, and F is a scaled form of the complementary Gaussian error function. $E_b/N_0$ is proportional to SNR. Accordingly, the performance of BER may be improved with higher SNR.

By integrating NC with MIMO-OFDM features, the disclosed system can support high data rates, real-time data transmission, and an independent and in-parallel data routing. The system is scalable, modular and predictable. Scalability is achieved due to a significant reduction in the number of wires needed for routing between NCs and the use of OFDM methods. The system is modular due to the reuse of the router, IP core, and connections. Further, the system is predictable due to the well-controlled and optimized electrical parameters provided by the stability of wired connections. The system also minimizes or avoids the issues of multipath fading channel in wireless systems, deadlock, livelock, data loss, and unpredictable data traffic jams.

In the described system, there can be close proximity of on-device wires (e.g., in the central router). Since these wires have a high metal resistance e.g., around 150K ohm/m, the wires may be treated RC lines up until the frequency where the inductive series impedance of the wire is equal to its resistance per meter. This frequency, referred to as the takeover frequency, for on-device wires, may be estimated to be higher than 40 GHz. Advantageously, since the signal frequencies in the disclosed systems do not achieve such frequency levels, frequency related effects that cause problems for DSL, such as near end crosstalk (NEXT) and far end crosstalk (FEXT), can be avoided.

Figure 9:
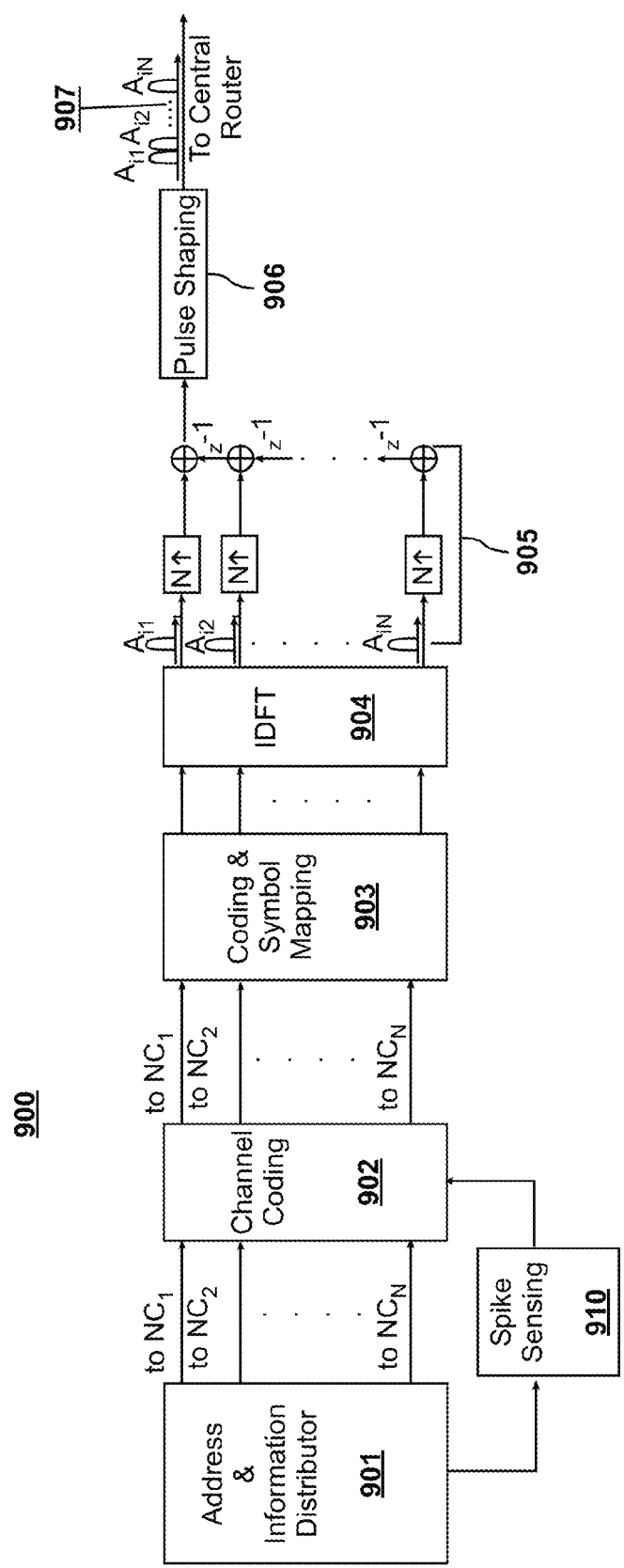
FIG. 9 illustrates a transmitter for a NC including a spike sensing module and a channel coding module that are inserted into the signal processing pathway for adaptation to non-uniform distribution of spikes between NCs according to the present disclosure.
Figure 10:
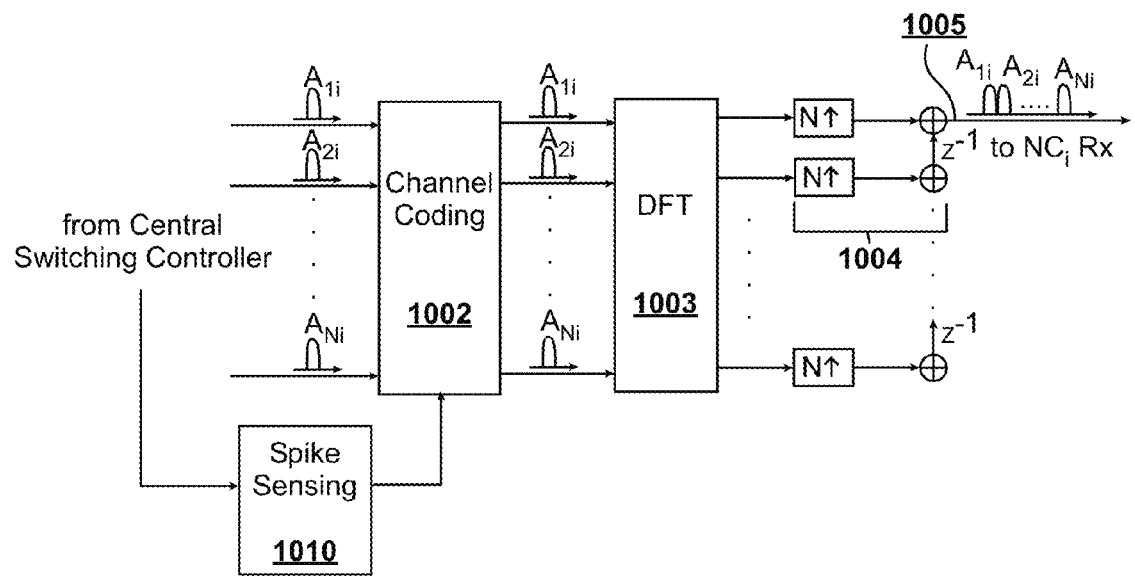
FIG. 10 illustrates a transmitter for a central router including a spike sensing module and a channel coding module that are inserted into the signal processing pathway for adaptation to non-uniform distribution of spikes between NCs according to the present disclosure.

In one embodiment, the number of spike events transmitted to each NC may be non-uniformly distributed. In one example, reconfigurable FFT/IFFT and/or sub-channelization resource allocation may be used with channel coding and spike traffic sensing to enable the system to adaptively handle non-uniform spike traffic distribution between the NCs in the system. As shown in FIGS. 9 and 10, a spike traffic sensing engine may be added before each transmitter in the NC and/or central router to estimate an initial sub-carrier assignment. Channel coding may be used for further identification and final assignment of non-uniform subcarrier allocation.

In one embodiment, a spike sensing circuit may be configured to monitor spike traffic in real time. By sensing the spike traffic in a certain period, such as one millisecond, the number of spike events needed to be transmitted to each NC. Each spike event may be allocated to a different channel. Referring to FIG. 9, a transmitter 900 for an NC may include an address an information distributor 901, a channel coding block 902, a coding and symbol mapping circuit 903 and IDFT circuit 904, an upsampling circuit 905, and pulse shaping circuit 906, and an output 907. A spike sensing circuit may be coupled between the address and information distributor 901 and channel coding circuit 902.

As shown in FIG. 10, a transmitter 1000 of a central router may provide traffic from the central switching controller and input into a spike sensing circuit 1010. The output may be fed into a channel coding circuit 1002 and then to a DFT circuit 1003. The signal may then be upsampled at a circuit 1004 and output at 1005.

Figure 11:
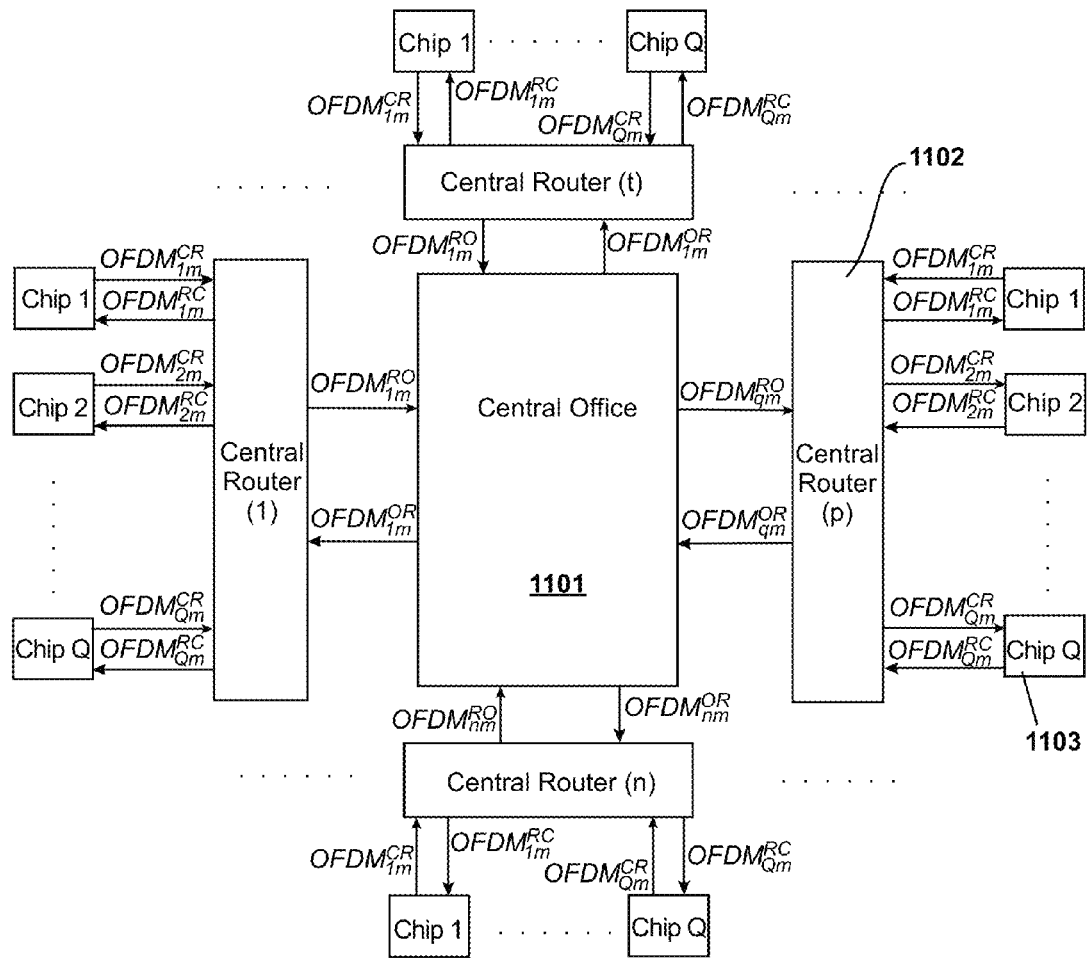
FIG. 11 illustrates a hierarchical architecture of the neuromorphic system in which several MIMO-OFDM systems are coupled via a central office according to the present disclosure.

In another embodiment, the system 1100 may be scaled into larger neuromorphic systems, as shown in FIG. 11, each neuromorphic routing system described may serve as a cellular or a local area for spike event transmission. The spike event transmission among these cellular regions may be routed through one central office 1101 from one or more central routers 1102. Each central router may be coupled to one or more NCs 1103.

In other embodiments, the processing modules may be implemented using a shared processing device, individual processing devices, or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The present invention or any part(s) or function(s) thereof, may be implemented using hardware, software, or a combination thereof, and may be implemented in one or more computer systems or other processing systems. A computer system for performing the operations of the present invention and capable of carrying out the functionality described herein can include one or more processors connected to a communications infrastructure (e.g., a communications bus, a cross-over bar, or a network). Various software embodiments are described in terms of such an exemplary computer system. After reading this description, it will become apparent to a person skilled in the relevant art(s) how to implement the invention using other computer systems and/or architectures.

The foregoing description of the preferred embodiments of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 35 U.S.C. Sec. 112, sixth paragraph, unless the element is expressly recited using the phrase "means for . . . . "

It should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A system comprising:
   a plurality of neuromorphic devices, each respective neuromorphic device having a transmitter and a receiver, and a plurality of neurons, wherein each respective neuromorphic device is configured to:
   separate a plurality of data from the plurality of neurons to be transmitted to a plurality of destinations, each data comprising a first sub-word and a second sub-word, wherein the first sub-word encodes a P value for making synaptic conductance changes at a synapse of a receiving post-synaptic neuron based on spike timing dependent plasticity and wherein the second sub-word comprises a destination address, into a plurality of channels, wherein each respective channel of the plurality of channels comprises respective data for a destination neuromorphic device having the respective destination address;
   use FDM or OFDM to separate the plurality of data into a plurality of frequency bands;
   combine the separated plurality of data into respective combined data; and
   transmit the respective combined data; and
   a central router having a plurality of router receivers and a plurality of router transmitters, where at least one respective router receiver and at least one respective router transmitter is coupled to a respective neuromorphic device, and wherein the central router is configured to;
   receive each respective combined data at least at one respective a router receiver, wherein at least one respective router receiver comprises a MIMO receiver;
   separate in parallel the respective combined data received from each respective neuromorphic device into a plurality of separated first data, wherein each respective separated first data of the plurality of first data has the same destination address; and
   transmit each separated respective first data using at least one respective router transmitter to a receiver of another one of the plurality of neuromorphic devices associated with the destination address, wherein at least one respective router transmitter comprises a MIMO transmitter.

2. The system of claim 1, wherein the plurality of neuromorphic devices comprises a MIMO device.

3. The system of claim 1, wherein the plurality of neuromorphic devices is configured to use TDM to combine the separated plurality of data.

4. The system of claim 1, wherein the transmitter of each of the plurality of neuromorphic devices is configured at the same frequency.

5. The system of claim 1, wherein the transmitter of the neuromorphic device and the receiver of the central router are configured as a trans-multiplexer.

6. The system of claim 1, wherein the receiver of the neuromorphic device and the transmitter of the central router are configured as a trans-multiplexer.

7. The system of claim 1, wherein the central router further comprises a central switching controller configured to group the first data by destination address.

8. The system of claim 1, wherein the central router is configured to use one of FDM and OFDM.

9. The system of claim 1, wherein the central router device is configured to use TDM to combine the data.

10. The system of claim 1 further comprising a spike sensing circuit coupled to one of the central router and the neuromorphic device.

11. The system of claim 1 wherein the central router is further configured to perform an Inverse Discrete Fourier Transform (IDFT).

12. The system of claim 1 wherein:
use FDM or OFDM comprises perform a Discrete Fourier Transform (DFT), wherein the DFT has a plurality of DFT inputs, each DFT input coupled to a respective one of the plurality of channels, and wherein the DFT has a plurality of DFT outputs; and
combine the separated plurality of data into respective combined data comprises combine the plurality of DFT outputs into one output channel having the respective combined data.

13. The system of claim 1 wherein:
the transmitter of at least one neuromorphic device comprises a MIMO transmitter; and
the receiver of at least one neuromorphic device comprises a MIMO receiver.

14. A method for communication between a plurality of neuromorphic devices, each respective neuromorphic device having a transmitter and a receiver, and a plurality of neurons, the method comprising:
separating a plurality of data from a plurality of neurons to be transmitted to a plurality of destinations, comprising a first sub-word and a second sub-word, wherein the first sub-word encodes a P value for making synaptic conductance changes at a synapse of a receiving post-synaptic neuron based on spike timing dependent plasticity and wherein the second sub-word comprises a destination address, into a plurality of channels, wherein each respective channel of the plurality of channels comprises respective data for a destination neuromorphic device having the respective destination address;
using FDM or OFDM to separate the plurality of data into a plurality of frequency bands;
combining the separated plurality of data into respective combined data; and
transmitting the respective combined data using the transmitter to a central router having a plurality of router receivers and a plurality of router transmitters, where at least one respective router receiver and at least one respective router transmitter is coupled to a respective neuromorphic device;
receiving each respective combined data at the central router using at least at one respective router receiver, wherein at least one respective router receiver comprises a MIMO receiver;
separating in parallel the respective combined data received from each respective neuromorphic device into a plurality of separated first data, wherein each respective separated first data of the plurality of first data has the same destination address; and
transmitting each separated respective first data using at least one respective router transmitter to a receiver of another one of the plurality of neuromorphic devices associated with the destination address, wherein at least one respective router transmitter comprises a MIMO transmitter.

15. The method of claim 14, further comprising providing each of the plurality of neuromorphic devices operating at the same frequency.

16. The method of claim 14, further comprising grouping the first data by destination address.

17. The method of claim 14 further comprising providing a spike sensing circuit coupled to one of a central router and the neuromorphic device.

18. The method of claim 14 wherein separating the received combined data into first data sharing the same destination address comprises performing an Inverse Discrete Fourier Transform (IDFT).

19. The method of claim 14 wherein:
using FDM or OFDM comprises performing a Discrete Fourier Transform (DFT), wherein the DFT has a plurality of DFT inputs, each DFT input coupled to a respective one of the plurality of channels, and wherein the DFT has a plurality of DFT outputs; and
combining the separated plurality of data into respective combined data comprises combining the plurality of DFT outputs into one output channel having the respective combined data.

20. The method of claim 14 wherein:
the transmitter of at least one neuromorphic device comprises a MIMO transmitter; and
the receiver of at least one neuromorphic device comprises a MIMO receiver.

* * * * *